(12) United States Patent
Christie et al.

(10) Patent No.: US 8,323,463 B2
(45) Date of Patent: Dec. 4, 2012

(54) CATALYST CONTAINING OXYGEN TRANSPORT MEMBRANE

(75) Inventors: Gervase Maxwell Christie, Williamsville, NY (US); Jamie Robyn Wilson, Arlington, MA (US); Bart Antonie van Hassel, Weatgue, CT (US)

(73) Assignee: Praxair Technology, Inc., Danbury, CT (US)

( * ) Notice: Subject to any disclaimer, the term of this patent is extended or adjusted under 35 U.S.C. 154(b) by 168 days.

(21) Appl. No.: 12/968,699

(22) Filed: Dec. 15, 2010

(65) Prior Publication Data
US 2011/0180399 A1 Jul. 28, 2011

Related U.S. Application Data

(60) Provisional application No. 61/291,221, filed on Jan. 22, 2010.

(51) Int. Cl.
*C25B 13/04* (2006.01)
*C25C 7/04* (2006.01)
*B01D 53/22* (2006.01)
*H01M 8/10* (2006.01)
*H01M 8/12* (2006.01)

(52) U.S. Cl. ........ 204/295; 204/283; 205/159; 205/161; 205/162; 205/163; 205/634; 95/45; 95/54; 96/4; 429/481; 429/482; 429/483; 429/486; 429/488; 429/489; 429/491; 429/495; 429/496; 429/534

(58) Field of Classification Search .......... 204/283, 204/295; 205/159, 161, 162, 163, 165, 634; 95/45, 54; 96/4; 429/481, 482, 483, 486, 429/488, 489, 491, 495, 496, 497, 532, 533, 429/534
See application file for complete search history.

(56) References Cited

U.S. PATENT DOCUMENTS

| 5,569,633 | A  | * | 10/1996 | Carolan et al. | ............ 502/4 |
| 6,296,686 | B1 |   | 10/2001 | Prasad et al. | |
| 6,641,626 | B2 | * | 11/2003 | Van Calcar et al. | ......... 48/198.2 |
| 6,811,904 | B2 |   | 11/2004 | Gorte et al. | |

(Continued)

FOREIGN PATENT DOCUMENTS

WO WO 2007/086949 A2 8/2007

(Continued)

OTHER PUBLICATIONS

Sylvain DeVille; "Freeze-Casting of Porous Ceramics: A Review of Current Achievements and Issues"; Advanced Engineering Materials 2008, 10, No. 3, pp. 155-169.

*Primary Examiner* — Bruce Bell
(74) *Attorney, Agent, or Firm* — David M. Rosenblum

(57) ABSTRACT

A composite oxygen transport membrane having a dense layer, a porous support layer and an intermediate porous layer located between the dense layer and the porous support layer. Both the dense layer and the intermediate porous layer are formed from an ionic conductive material to conduct oxygen ions and an electrically conductive material to conduct electrons. The porous support layer has a high permeability, high porosity, and a high average pore diameter and the intermediate porous layer has a lower permeability and lower pore diameter than the porous support layer. Catalyst particles selected to promote oxidation of a combustible substance are located in the intermediate porous layer and in the porous support adjacent to the intermediate porous layer. The catalyst particles can be formed by wicking a solution of catalyst precursors through the porous support toward the intermediate porous layer.

18 Claims, 2 Drawing Sheets

U.S. PATENT DOCUMENTS

| | | |
|---|---|---|
| 6,846,511 B2 | 1/2005 | Visco et al. |
| 7,125,528 B2 | 10/2006 | Besecker et al. |
| 7,229,537 B2 | 6/2007 | Chen et al. |
| 7,351,488 B2 * | 4/2008 | Visco et al. ............ 429/486 |
| 7,534,519 B2 | 5/2009 | Cable et al. |
| 7,556,676 B2 * | 7/2009 | Nagabhushana et al. ...... 96/11 |
| 7,588,626 B2 * | 9/2009 | Gopalan et al. ............ 95/45 |
| 7,901,837 B2 * | 3/2011 | Jacobson et al. ........... 429/535 |
| 2005/0061663 A1 | 3/2005 | Chen et al. |
| 2005/0214612 A1 * | 9/2005 | Visco et al. ............ 429/30 |
| 2006/0127656 A1 | 6/2006 | Gallo et al. |
| 2006/0191408 A1 * | 8/2006 | Gopalan et al. ............ 95/55 |
| 2010/0015014 A1 * | 1/2010 | Gopalan et al. ........... 422/187 |
| 2010/0143824 A1 * | 6/2010 | Tucker et al. ............ 429/483 |
| 2011/0143255 A1 * | 6/2011 | Jain et al. ............ 429/489 |

FOREIGN PATENT DOCUMENTS

| | | |
|---|---|---|
| WO | WO 2008/024405 A2 | 2/2008 |

* cited by examiner

CATALYST CONTAINING OXYGEN TRANSPORT MEMBRANE

RELATED APPLICATIONS

The present application claims priority from U.S. Application Ser. No. 61/291,221, filed Jan. 22, 2010, which is incorporated by reference herein in its entirety.

U.S. GOVERNMENT RIGHTS

This invention was made with Government support under Cooperative-Agreement No. DE-FC26-07NT43088, awarded by the United States Department of Energy. The Government has certain rights in this invention.

FIELD OF THE INVENTION

The present invention relates to a composite oxygen transport membrane in which catalyst particles, selected to promote oxidation of a combustible substance, are located within an intermediate porous layer that is in turn located between a dense layer and a porous support layer and within the porous support and a method of applying the catalyst to the intermediate porous layer and the porous support layer through wicking of catalyst precursors through the porous support layer to the intermediate porous layer.

BACKGROUND OF THE INVENTION

Oxygen transport membranes function by transporting oxygen ions through a material that is capable of conducting oxygen ions and electrons at elevated temperatures. Such materials can be mixed conducting in that they conduct both oxygen ions and electrons or a mixture of materials that include an ionic conductor capable of primarily conducting oxygen ions and an electronic conductor with the primary function of transporting the electrons. Typical mixed conductors are formed from doped perovskite materials. In case of a mixture of materials, the ionic conductor can be yttrium or scandium stabilized zirconia and the electronic conductor can be a perovskite that will transport electrons, a metal or metal alloy or a mixture of the perovskite, the metal or metal alloy.

When a partial pressure difference of oxygen is applied on opposite sides of such a membrane, oxygen ions will ionize on one surface of the membrane and emerge on the opposite side of the membrane and recombine into elemental oxygen. The free electrons resulting from the combination will be transported back through the membrane to ionize the oxygen. The partial pressure difference can be produced by providing the oxygen containing feed to the membrane at a positive pressure or by supplying a combustible substance to the side of the membrane opposing the oxygen containing feed or a combination of the two methods.

Typically, oxygen transport membranes are composite structures that include a dense layer composed of the mixed conductor or the two phases of materials and one or more porous supporting layers. Since the resistance to oxygen ion transport is dependent on the thickness of the membrane, the dense layer is made as thin as possible and therefore must be supported. Another limiting factor to the performance of an oxygen transport membrane concerns the supporting layers that, although can be active, that is oxygen ion or electron conducting, the layers themselves can consist of a network of interconnected pores that can limit diffusion of the oxygen or fuel or other substance through the membrane to react with the oxygen. Therefore, such support layers are typically fabricated with a graded porosity in which the pore size decreases in a direction taken towards the dense layer or are made highly porous throughout. The high porosity, however, tends to weaken such a structure.

U.S. Pat. No. 7,229,537 attempts to solve such problems by providing a support with cylindrical or conical pores that are not connected and an intermediate porous layer located between the dense layer and the support that distributes the oxygen to the pores within the support. Porous supports can also be made by freeze casting techniques, as described in 10, No. 3, Advanced Engineering Materials, "Freeze-Casting of Porous Ceramics: A Review of Current Achievements and Issues" (2008) by Deville, pp. 155-169. In freeze casting, a liquid suspension is frozen. The frozen liquid phase is then sublimated from a solid to a vapor under reduced pressure. The resulting structure is sintered to consolidate and densify the structure. This leads to a porous structure having pores extending in one direction and that have a low toruosity. Such supports have been used to form electrode layers in solid oxide fuel cells. In addition to the porous support layers, a porous surface exchange layer can be located on the opposite side of the dense layer to enhance reduction of the oxygen into oxygen ions. Such a composite membrane is illustrated in U.S. Pat. No. 7,556,626 that utilizes two phase materials for the dense layer, the porous surface exchange layer and the intermediate porous layer. These layers are supported on a porous support that can be formed of zirconia.

As mentioned above, the oxygen partial pressure difference can be created by combusting a fuel or other combustible substance with the separated oxygen. The resulting heat will heat the oxygen transport membrane up to operational temperature and excess heat can be used for other purposes, for example, heating a fluid, for example, raising steam in a boiler or in the combustible substance itself. While perovskite materials will exhibit a high oxygen flux, such materials tend to be very fragile under operational conditions such as in the heating of a fluid. This is because the perovskite will have a variable stoichiometry with respect to oxygen. In air it will have one value and in the presence of a fuel that is undergoing combustion it will have another value. The end result is that at the fuel side, the material will tend to expand relative to the air side and a dense layer will therefore, tend to fracture. In order to overcome this problem, a mixture of materials can be used in which an ionic conductor is provided to conduct the oxygen ions and an electronic conductor is used to conduct the electrons. Where the ionic conductor is a fluorite, this chemical expansion is restrained, and therefore the membrane will be less susceptible to structural failure. However, the problem with the use of a fluorite, such as a stabilized zirconia, is that such a material has a lower oxygen ion conductivity. As a result, far more oxygen transport membrane elements are required for such a dual phase type of membrane as compared with one that is formed from a single phase perovskite.

As will be discussed, the present invention provides a robust oxygen transport membrane that utilizes a fluorite as an ionic conductor and that incorporates a deposit of a catalyst in an intermediate porous layer located between a dense layer and a porous support to promote oxidation of the combustible substance and thereby increase the oxygen flux that would otherwise have been obtained with the use of a fluorite as an ionic conductor.

SUMMARY OF THE INVENTION

The present invention provides a composite oxygen transport membrane that comprises a membrane element having a plurality of layers that comprise a dense layer, a porous support and an intermediate porous layer located between the dense layer and the porous support. Each of the dense layer and the intermediate porous layer are capable of conducting oxygen ions and electrons at an elevated operational temperature to separate oxygen from an oxygen containing feed. The dense layer and the intermediate porous layer comprising a mixture of an ionic conductive material and an electrically conductive material to conduct oxygen ions and electrons, respectively. The ionic conductive material is composed of a fluorite. The intermediate porous layer has a lower permeability and a smaller average pore size than the porous support layer to distribute the oxygen separated by the dense layer towards the porous support layer. Catalyst particles or a solution containing precursors of the catalyst particles are located in the intermediate porous layer and in the porous support adjacent to the intermediate porous layer. The catalyst particles contain a catalyst selected to promote oxidation of the combustible substance in the presence of the oxygen when the combustible substance is introduced into the pores of the porous support, on a side thereof opposite to the intermediate porous layer. The membrane element as described above will exhibit an increase in oxygen flux as compared to a membrane employing a dual phase conductor in which the ionic conductor is composed of a fluorite.

The porous support layer can have a permeability of between 0.25 Darcy and about 0.5 Darcy and an average porosity of greater than about 20 percent to inhibit diffusion resistance of a combustible substance through the porous support layer and the combustion products produced through combustion of the combustible substance. Standard procedures for measuring the permeability of a substrate in terms of Darcy number are outlined in ISO 4022.

It is to be noted that the term "combustible substance" as used herein and in the claims means any substance that is capable of being oxidized, including, but not limited, to a fuel in case of a boiler, a hydrocarbon containing substance for purposes of oxidizing such substance for producing a hydrogen and carbon monoxide containing synthesis gas or the synthesis gas itself for purposes of supplying heat to, for example, a reformer. As such the term, "oxidizing" as used herein and in the claims encompasses both partial and full oxidation of the substance.

The porous support layer can be a freeze cast substance. Another possibility is to fabricate the porous support layer with cylindrical or conical pores. The catalyst can be gadolinium doped ceria. Further, the plurality of layers can also comprise a porous surface exchange layer in contact with the dense layer opposite to the intermediate porous layer and the catalyst is gadolinium doped ceria. The support layer is preferably formed from a fluorite, for example 3 mol % yttria stabilized zirconia, or 3YSZ.

In a specific embodiment of the present invention, the intermediate porous layer can have a thickness of between about 10 microns and about 40 microns, a porosity of between about 25 percent and about 40 percent and an average pore diameter of between about 0.5 microns and about 3 microns. The dense layer can have a thickness of between about 10 microns and about 30 microns. The porous surface exchange layer can be provided with a thickness of between about 10 microns and about 40 microns, a porosity of between about 30 percent and about 60 percent and a pore diameter of between about 1 microns and about 4 microns and the support layer can have a thickness of between about 0.5 mm and about 4 mm and a pore size no greater than about 50 microns. The intermediate porous layer can contain a mixture of about 60 percent by weight of $(La_{0.825}Sr_{0.175})_{0.96}Cr_{0.76}Fe_{0.225}V_{0.015}O_{3-\delta}$, remainder 10Sc1YSZ, the dense layer can be formed of a mixture of about 40 percent by weight of $(La_{0.825}Sr_{0.175})_{0.94}Cr_{0.72}Mn_{0.26}V_{0.02}O_{3-\delta}$, remainder 10Sc1YSZ and the porous surface exchange layer can be formed by a mixture of about 50 percent by weight of $(La_{0.8}Sr_{0.2})_{0.98}MnO_{3-\delta}$, remainder 10Sc1YSZ. In such case, the support layer is formed from 3YSZ. The support layer can be formed of a freeze cast material that has a permeability of between about 0.25 Darcy and about 0.5 Darcy and pores that are about 3 microns in diameter at a side of the porous support layer that is adjacent to the intermediate porous support and about 10 microns in diameter at the opposite side of the porous support layer.

In another aspect, the present invention provides a method of applying a catalyst to a composite oxygen transport membrane. In accordance with such method, a composite oxygen transport membrane is formed in a sintered state. The composite oxygen transport membrane has a plurality of layers comprising a dense layer, a porous support layer and an intermediate porous layer located between the dense layer and the porous support layer, each of the dense layer and the intermediate porous layer capable of conducting oxygen ions and electrons at an elevated operational temperature to separate oxygen from an oxygen containing feed. The dense layer and the intermediate porous layer comprising a mixture of an ionic conductive material and electrically conductive materials to conduct oxygen ions and electrons, respectively; the ionic conductive material being a fluorite. A solution containing catalyst precursors is applied to the porous support layer on a side thereof opposite to the intermediate porous layer. The catalyst precursors are selected to produce a catalyst upon applying heat to the solution and the catalyst is capable of promoting oxidation of the combustible substance in the presence of the oxygen. Pores within the porous support layer are infiltrated with the solution so that the solution penetrates the pores and also, at least partially infiltrates the intermediate porous layer. The infiltration of the pores is conducted, at least in part, from the solution wicking through the pores, from one side of the porous support layer located opposite to the intermediate porous layer to the other side of the intermediate porous layer located adjacent to the intermediate porous layer. The composite oxygen transport membrane is heated after infiltrating the pores and the intermediate porous layer such that the catalyst is formed from the catalyst precursors.

The porous support layer can have a permeability of between 0.25 Darcy and about 0.5 Darcy and an average porosity of greater than about 20 percent. The porous support layer can be formed by freeze casting. The solution can be an aqueous metal ion solution containing 20 mol % $Gd(NO_3)_3$ and 80 mol % $Ce(NO_3)_3$ that when sintered forms $Gd_{0.8}Ce_{0.2}O_{2-\delta}$. A pressure can be established on the side of the support layer to assist in the infiltration of the solution or the pores can first be evacuated of air using a vacuum to further assist in wicking of the solution and prevent the opportunity of trapped air in the pores preventing wicking of the solution all the way through the support structure to the intermediate layer. The composite oxygen transport membrane can be heated in service or alternatively, can be heated prior to being placed in service. The term "service" as used herein and in the claims means contacting the composite oxygen transport membrane with an oxygen containing substance and a combustible substance and oxidizing the combustible substance with oxygen transported through the membrane to generate the heat.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
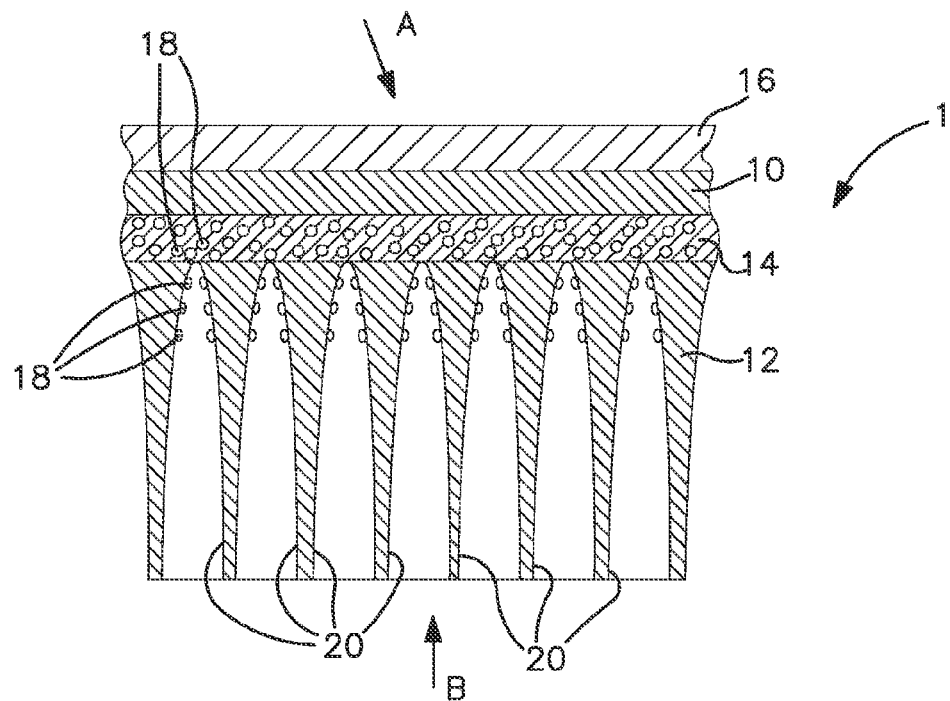
FIG. 1 is a cross-sectional schematic view of a composite oxygen transport membrane element of the present invention that is fabricated in accordance with a method of the present invention.

With reference to FIG. 1, a sectional view of a composite oxygen transport membrane element 1 in accordance with the present invention is illustrated. As could be appreciated by those skilled in the art, such composite oxygen transport membrane element 1 could be in the form of a tube or a flat plate. Such composite oxygen transport membrane element 1 would be one of a series of such elements situated within a device to heat a fluid such as a boiler or other reactor having such a requirement.

Composite oxygen transport membrane element 1 is provided with a dense layer 10, a porous support layer 12 and an intermediate porous layer 14 located between the dense layer 10 and the porous support layer 12. A preferable option is, as illustrated, to also include a porous surface exchange layer 16 in contact with the dense layer 10, opposite to the intermediate porous layer 14. Catalyst particles 18 are located in the intermediate porous layer 14 that are formed of a catalyst selected to promote oxidation of a combustible substance in the presence of oxygen separated by the composite membrane element 1.

Operationally, air or other oxygen containing fluid is contacted on one side of the composite oxygen transport membrane element 1 and more specifically, against the porous surface exchange layer 16 in the direction of arrowhead "A". The porous surface exchange layer 16 is porous and is capable of mixed conduction of oxygen ions and electrons and functions to ionize some of the oxygen. The oxygen that is not ionized at and within the porous surface exchange layer 16, similarly, also ionizes at the adjacent surface of the dense layer 10 which is also capable of such mixed conduction of oxygen ions and electrons. The oxygen ions are transported through the dense layer 10 to intermediate porous layer 14 to be distributed to pores 20 of the porous support layer 12. Some of the oxygen ions, upon passage through the dense layer will recombine into elemental oxygen. The recombination of the oxygen ions into elemental oxygen is accompanied by the loss of electrons that flow back through the dense layer to ionize the oxygen at the opposite surface thereof.

At the same time, a combustible substance, for example a hydrogen and carbon monoxide containing synthesis gas, is contacted on one side of the porous support layer 12 that is located opposite to the intermediate porous layer 14 as indicated by arrowhead "B". The combustible substance enters pores 20, contacts the oxygen and burns through combustion supported by the oxygen. The combustion is promoted by the catalyst that is present by way of catalyst particles 18.

The presence of combustible fuel on the side of the composite oxygen ion transport membrane element 1, specifically the side of the dense layer 10 located adjacent to the intermediate porous layer 14 provides a lower partial pressure of oxygen. This lower partial pressure drives the oxygen ion transport as discussed above and also generates heat to heat the dense layer 10, the intermediate porous layer 14 and the porous surface exchange layer 16 up to an operational temperature at which the oxygen ions will be conducted. In specific applications, the incoming oxygen containing stream can also be pressurized to enhance the oxygen partial pressure difference between opposite sides of the composite oxygen ion transport membrane element 1. Excess heat that is generated by combustion of the combustible substance will be used in the specific application, for example, the heating of water into steam within a boiler or for heating the combustible substance itself for later partial oxidation reactions.

As indicated above, the use of a single phase mixed conducting material such as a perovskite has the disadvantage of exhibiting chemical expansion, or in other words, one side of a layer, at which the oxygen ions recombine into elemental oxygen, will expand relative to the opposite side thereof. This resulting stress can cause failure of such a layer or separation of the layer from adjacent layers. In order to avoid this, the dense layer 10, the intermediate porous layer 14 and the porous surface exchange layer 16 were all formed of a two phase system comprising a fluorite in one phase as the ionic conductor of the oxygen ions and an electronic conducting phase that in the illustrated embodiment is a perovskite. In the illustrated embodiment, the porous support layer 12 was formed of the fluorite only and as such does not exhibit significant mixed conduction. However, as will be discussed, other materials for a porous support layer are possible such as oxide disbursed strengthened metals or other high strength ceramic materials. The material used in forming the porous support layer 12 preferably has a thermal expansion coefficient in the range $9 \times 10^{-6}$ cm/cm×$K^{-1}$ and $12 \times 10^{-6}$ cm/cm× $K^{-1}$ in the temperature range of 20° C. to 1000° C.; where "K" is the temperature in Kelvin.

As discussed above, dense layer 10 functions to separate oxygen from an oxygen containing feed exposed to one surface of the oxygen ion transport membrane 10 and contains an electronic and ionic conducting phases. As discussed above, the electronic phase of $(La_uSr_vCe_{1-u-v})_wCr_xMn_yV_zO_{3-\delta}$ ("LSCMV"), where u is from about 0.7 to about 0.9, v is from about 0.1 to about 0.3 and (1-u-v) is greater than or equal to zero, w is from about 0.94 to about 1, x is from about 0.67 to about 0.77, y is from about 0.2 to about 0.3, z is from about 0.015 to about 0.03, and x+y+z=1. The ionic phase is $Zr_xSc_{y'}A_{z'}O_{2-\delta}$ ("YScZ"), where y' is from about 0.08 to about 0.15, z' is from about 0.01 to about 0.03, x'+y'+z'=1 and A is Y or Ce or mixtures of Y and Ce. The variable "δ" as used in the formulas set forth below for the indicated substances, as would be known in the art would have a value that would render such substances charge neutral. It is to be noted, that since the quantity (1-u-v) can be equal to zero, cerium may not be present within an electronic phase of the present invention. In fact, preferably, the dense layer 10 contains a mixture of about 40 percent by weight of $(La_{0.825}Sr_{0.175})_{0.94}Cr_{0.72}Mn_{0.26}V_{0.02}O_{3-\delta}$, remainder 10Sc1YSZ. As also mentioned above, in order to reduce the resistance to oxygen ion transport, the dense layer should be made as thin as possible and in the illustrated embodiment has a thickness of between about 10 microns and about 30 microns.

Porous surface exchange layer 16 enhances the surface exchange rate by enhancing the surface area of the dense layer 10 while providing a path for the resulting oxygen ions to diffuse through the mixed conducting oxide phase to the dense layer 10 and for oxygen molecules to diffuse through the open pore space to the same. The porous surface exchange layer 16 therefore, reduces the loss of driving force in the surface exchange process and thereby increases the achievable oxygen flux. As indicated above, it also can be a two-phase mixture containing an electronic conductor composed of $(La_{x'''}Sr_{1-x'''})_{y'''}MO_{3-\delta}$, where x''' is from about 0.2 to about 0.9, y''' is from about 0.95 to 1, M=Mn, Fe and an ionic conductor composed of $Zr_x^{iv}Sc_y^{iv}A_z^{iv}O_{2-\delta}$, where $y^{iv}$ is from about 0.08 to about 0.15, $z^{iv}$ is from about 0.01 to about 0.03, $x^{iv}+y^{iv}+z^{iv}=1$ and A=Y, Ce. In the illustrated embodiment, porous surface exchange layer 16 is formed of a mixture of about 50 percent by weight of $(La_{0.8}Sr_{0.2})_{0.98}MnO_{3-\delta}$, remainder 10Sc1YSZ. The porous surface exchange layer is a porous layer and preferably has a thickness of between about 10 microns and about 40 microns, a porosity of between about 30 percent and about 60 percent and a pore diameter of between about 1 microns and about 4 microns.

The intermediate porous layer 14 is formed of the same mixture as the dense layer 10 and preferably has a thickness of between about 10 microns and about 40 microns, a porosity of between about 25 percent and about 40 percent and an average pore diameter of between about 0.5 microns and about 3 microns. In addition, incorporated within the intermediate porous layer 14 are catalyst particles 18. Catalyst particles 18 are preferably gadolinium doped ceria ("CGO") that have a size of between about 0.1 and about 1 microns. Preferably, the intermediate porous layer 14 contains a mixture of about 60 percent by weight of $(La_{0.825}Sr_{0.175})_{0.96}Cr_{0.76}Fe_{0.225}V_{0.015}O_{3-\delta}$, remainder 10Sc1YSZ. It is to be noted that intermediate porous layer 14 as compared with the dense layer 10 contains Iron in place of Manganese, a lower A-site deficiency, a lower transition metal (Iron) content on the B-site, and a slightly lower concentration of vanadium on the B-site. It has been found by the inventors herein that the presence of Iron aids combustion in the intermediate porous layer, also that the presence of Manganese at higher concentration and a higher A-site deficiency in the dense layer improves electronic conductivity and sintering kinetics. A higher concentration of vanadium is present in the dense layer because vanadium is a sintering aid, and is required for densification of the dense layer. Vanadium is required in lesser extent in the intermediate porous layer to match shrinkage and expansion characteristics with the dense layer.

The porous support layer 12 can be formed by known freeze casting techniques. Although pores 20 are indicated as being a regular network of non-interconnected pores, in fact there exists some degree of connection between pores 20 towards the intermediate porous layer 14. Consequently, intermediate porous layer 14 has a tortuosity of greater than 1. However, as indicated previously, the open porous network provided by the porous support layer should be selected so as to promote diffusion of the combustible substance to the intermediate porous layer 14 and the flow of combustion products such as steam and carbon dioxide from the pores 20 in a direction opposite to that of arrowhead "B". The porosity of porous support layer 14 should be greater than about 20 percent both for the embodiment illustrated in FIG. 1 as well as other possible embodiments of the present invention. The porous support layer 12 preferably has a permeability of between about 0.25 Darcy and about 0.5 Darcy. Porous support layer 12 preferably has a thickness of between about 0.5 mm and about 4 mm and a pore size of no greater than 50 microns, again, in any embodiment. This being said, for the freeze cast porous support layer 14, the permeability preferably between about 0.25 Darcy and about 0.5 Darcy and the pores vary in diameter from about 3 microns at the size of porous support layer 12 adjacent to the intermediate porous layer 14 and about 10 microns at the opposite side of the porous support layer 12. Porous support layer 12 is fabricated from 3YSZ. Additionally, porous support layer 12 also has catalyst particles 18 located adjacent to the intermediate porous layer 14 within pores 20 for purposes of also promoting combustible substance oxidation. The presence of catalyst particles 18 both within the intermediate porous layer and within the porous support layer 12 provides enhancement of oxygen flux and therefore generation of more heat that can be obtained by either providing catalyst particles within solely the intermediate porous layer 14 or the porous support layer 12 alone. It is to be noted that to a lesser extent, catalyst particles 18 can also be located in region of the pores 20 that are more remote from the intermediate porous layer 14, and therefore do not participate in promoting fuel oxidation. However, the bulk of catalyst in a composite oxygen transport element of the present invention is, however, located in the intermediate porous layer 14 and within the pores 20, adjacent the intermediate porous layer 14.

Figure 2:
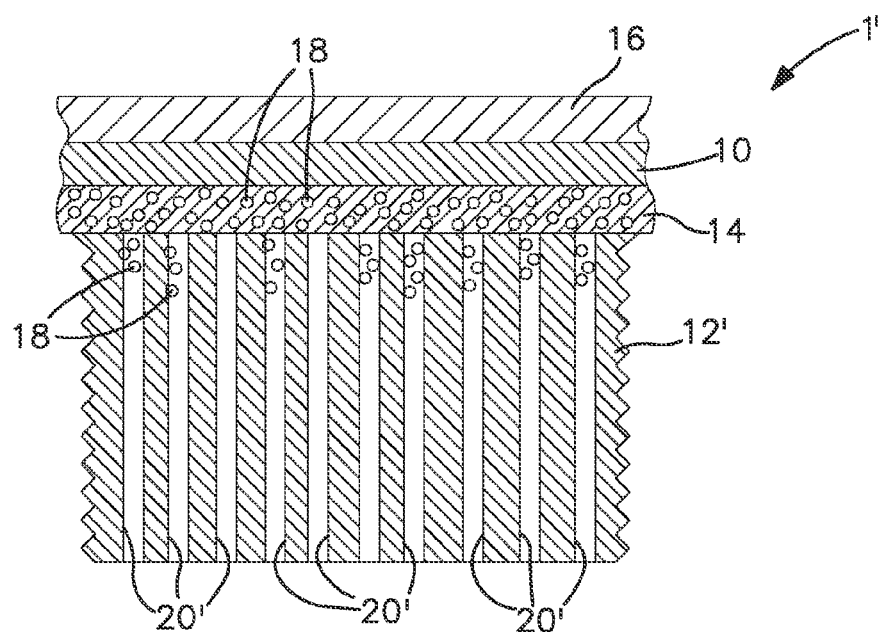
FIG. 2 is an alternative embodiment of FIG. 1.
Figure 3:
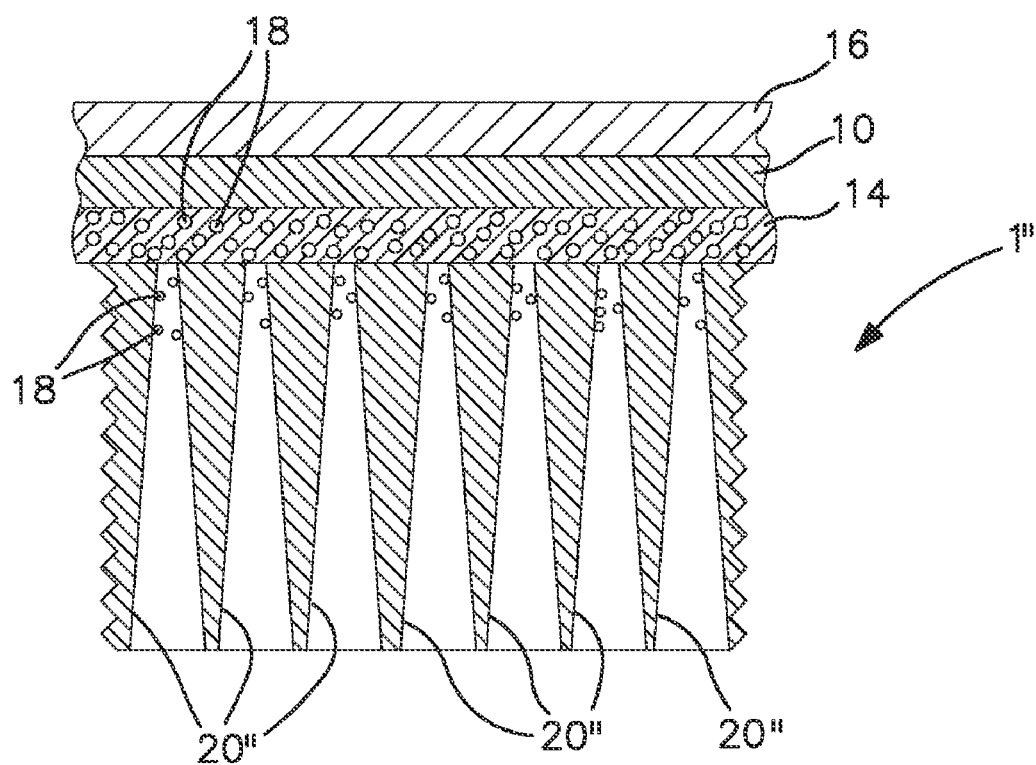
FIG. 3 is an alternative embodiment of FIG. 1.

With brief reference to FIGS. 2 and 3, the porous support layers 12' and 12" illustrated in such Figures can have cylindrical pores 20' or conical pores 20". Such pores could be formed from E-beam drilling or laser cutting techniques and as such the tortuosity would be equal to 1. Further, such supporting structure could be fabricated from materials such as oxide disbursed strengthened metals or other high strength ceramic materials.

In forming a composite oxygen transport membrane element in accordance with the present invention, the porous support (12 or 12' or 12") is first formed in a manner known in the art and as set forth in the references discussed above. For example, a freeze cast supporting structure could be formed in the manner discussed in "Freeze-Casting of Porous Ceramics: A Review of Current Achievements and Issues" (2008) by Deville, pp. 155-169 and a porous support having cylindrical or conical pores could be formed as discussed in U.S. Pat. No. 7,229,537. In either of such cases, the porous support could be formed into a tube in a green state and then subjected to a bisque firing at 1050° C. for 4 hours to achieve reasonable strength for further handling. After firing, the resulting tube can be checked for porosity and permeability and stored in a dry oven at about 60° C.

After forming the green tube, intermediate porous layer 14 is then formed. A mixture of about 34 grams of powders having electronic and ionic phases, LSCMV and 10Sc1YSZ, respectively, is prepared so that the mixture contains equal proportions by volume of LSCMV and 10Sc1YSZ. Prior to forming the mixture, the catalyst particles of 18 that can be CGO are so incorporated into the electronic phase LSCMV by forming deposits of such particles on the electronic phase, for example, by precipitation. However, it is more preferable to form the catalyst particles 18 within the intermediate porous layer by wicking a solution containing catalyst precursors through the porous support layer 12 towards the intermediate porous layer 14 as described below. As such, there is no requirement to deposit particles of catalyst on the electronic phase. The electronic phase particles are each about 0.3 microns prior to firing and the catalyst particles are about 0.1 microns or less and are present in a ratio by weight of 10 wt %. To the mixture, 100 grams of toluene, 20 grams of the binder of the type mentioned above, 400 grams of 1.5 mm diameter YSZ grinding media are added. The mixture is then milled for about 6 hours to form a slurry ($d_{50}$ of about 0.34 μm). About 6 grams of carbon black having a particle size of about d50=0.8 μm is then added to the slurry and milled for additional 2 hours. An additional 10 grams of toluene and about 10 grams of additional binder were added to the slurry and mixed for between about 1.5 and about 2 hours. The inner wall of the green tube formed above is then coated by pouring the slurry, holding once for 5 seconds and pouring out the residual back to the bottle. The coated green tube is then dried and fired at 850° C. for 1 hour in air for binder burnout.

The dense layer 10 is then applied. A mixture weighing about 40 grams is prepared that contains the same powders as used in forming the intermediate porous layer 14, discussed above, except that the ratio between LSCMV and 10Sc1YSZ is about 40/60 by volume, 2.4 grams of cobalt nitrate {Co(NO$_3$)$_2$.6H$_2$O}, 95 grams of toluene, 5 grams of ethanol, 20 grams of the binder identified above, 400 grams of 1.5 mm diameter YSZ grinding media are then added to the mixture and the same is milled for about 10 hours to form a slurry (d$_{50}$~0.34 μm). Again, about 10 grams of toluene and about 10 grams of binder are added to the slurry and mixed for about 1.5 and about 2 hours. The inner wall of the tube is then coated by pouring the slurry, holding once for 10 seconds and pouring out the residual back to the bottle. The tube is then stored dry prior to firing the layers in a controlled environment.

The coated green tube is then placed on a C-setter in a horizontal tube furnace and porous alumina tubes impregnated with chromium nitrate are placed close to the coated tube to saturate the environment with chromium vapor. The tubes are heated in static air to about 800° C. for binder burnout and the environment is switched to an atmosphere of a saturated nitrogen mixture (nitrogen and water vapor) that contains about 4 percent by volume of hydrogen to allow the vanadium containing electronic conducting perovskites to properly sinter. The tube is held at about 1350° C. to 1400° C. for 8 hours and then cooled in nitrogen to complete the sintering of the materials. The sintered tube is checked for helium leak rates that should be lower than 10$^{-7}$ Pa.

Surface exchange layer 16 is then applied. A mixture of powders is prepared that contains about 35 g of equal amounts of ionic and electronic phases having chemical formulas of Zr$_{0.89}$Sc$_{0.1}$Y$_{0.01}$O$_{2-\delta}$ and La$_{0.8}$Sr$_{0.2}$FeO$_{3-\delta}$, respectively. To this mixture, about 100 grams of toluene, 20 grams of the binder identified above, about 400 grams of 1.5 mm diameter YSZ grinding media are added and the resultant mixture is milled for about 14 hours to form a slurry (d$_{50}$~0.4 μm). About six grams of carbon black are added to the slurry and milled for additional 2 hours. A mixture of about 10 grams of toluene and about 10 grams of the binder are then added to the slurry and mixed for between about 1.5 and about 2 hours. The inner wall of the tube is then coated by pouring the slurry, holding twice for about 10 seconds and then pouring out the residual back to the bottle. The coated tube is then dried and fired at 1100° C. for two hours in air.

The structure formed in the manner described above is in a fully sintered state and the catalyst is then further applied by wicking a solution containing catalyst precursors in the direction of arrowhead B at the side of the porous support 12 opposite to the intermediate porous layer 14. The solution can be an aqueous metal ion solution containing 20 mol % Gd(NO$_3$)$_3$ and 80 mol % Ce(NO$_3$)$_3$. A pressure can be established on the side of the support layer to assist in the infiltration of the solution or the pores can first be evacuated of air using a vacuum to further assist in wicking of the solution and prevent the opportunity of trapped air in the pores preventing wicking of the solution all the way through the support structure to the intermediate porous layer 14. The resulting composite oxygen transport membrane 1 in such state can be directly placed into service or further fired prior to being placed into service so that the particles 18, in this case Ce$_{0.8}$Gd$_{0.2}$O$_{2-\delta}$, are formed in the porous support 12 adjacent to the intermediate porous layer 14 and as described above, within the intermediate porous layer 14 itself. The firing to form Ce$_{0.8}$Gd$_{0.2}$O$_{2-\delta}$ would take place at a temperature of about 850° C. and would take about 1 hour to form the particles 18.

Although the present invention has been described with reference to a preferred embodiment, as will occur to those skilled in the art, changes and additions to such embodiment can be made without departing from the spirit and scope of the present invention as set forth in the appended claims.

We claim:

1. A composite oxygen transport membrane, said composite oxygen transport membrane comprising:
   a membrane element having a plurality of layers;
   the plurality of layers comprising a dense layer, a porous support layer and an intermediate porous layer located between the dense layer and the porous support layer, each of the dense layer and the intermediate porous layer capable of conducting oxygen ions and electrons at an elevated operational temperature to separate oxygen from an oxygen containing feed;
   the dense layer and the intermediate porous layer comprising a mixture of an ionic conductive material and electrically conductive materials to conduct oxygen ions and electrons, respectively, the ionic conductive material being a fluorite;
   the intermediate porous layer having a smaller average pore size than the porous support layer to distribute the oxygen separated by the dense layer towards the porous support layer; and
   catalyst particles or a solution containing precursors of the catalyst particles located in the intermediate porous layer and in the porous support adjacent to the intermediate porous layer, the catalyst particles containing of a catalyst selected to promote oxidation of a combustible substance in the presence of the oxygen when the combustible substance is introduced into the pores of the porous support, on a side thereof opposite to the intermediate porous layer.

2. The composite oxygen transport membrane element of claim 1, wherein said porous support layer has a permeability of between 0.25 Darcy and 0.5 Darcy, an average porosity of greater than about 20 percent.

3. The composite oxygen transport membrane of claim 2, wherein said porous support layer is a freeze cast substance.

4. The composite oxygen transport membrane of claim 1, wherein said porous support layer has cylindrical or conical pores.

5. The composite oxygen transport membrane of claim 1 or claim 2 or claim 3 or claim 4, wherein the catalyst is gadolinium doped ceria.

6. The composite oxygen transport membrane of claim 1, wherein the plurality of layers also comprise a porous surface exchange layer in contact with the dense layer opposite to the intermediate porous layer and the catalyst is gadolinium doped ceria.

7. The composite oxygen transport membrane of claim 6, wherein the support layer is formed from a flourite.

8. The composite oxygen transport membrane of claim 6, wherein:
   the intermediate porous layer has a thickness of between about 10 microns and about 40 microns, a porosity of between about 25 percent and about 40 percent and an average pore diameter of between about 0.5 microns and about 3 microns;
   the dense layer has a thickness of between about 10 microns and about 30 microns;
   the porous surface exchange layer has a thickness of between about 10 microns and about 40 microns, a porosity of between about 30 percent and about 60 percent and a pore diameter of between about 1 microns and about 4 microns; and
   the porous support layer has a thickness of between about 0.5 mm and about 4 mm and a pore size no greater than 50 microns.

9. The composite oxygen transport membrane of claim 8, wherein:
the intermediate porous layer contains a mixture of about 60 percent by weight of $(La_{0.825}Sr_{0.175})_{0.96}Cr_{0.76}Fe_{0.225}V_{0.015}O_{3-\delta}$, remainder 10Sc1YSZ;
the dense layer contains a mixture of about 40 percent by weight of $(La_{0.825}Sr_{0.175})_{0.94}Cr_{0.72}Mn_{0.26}V_{0.02}O_{3-\delta}$, remainder 10Sc1YSZ;
the porous surface exchange layer is formed by a mixture of about 50 percent by weight of $(La_{0.8}Sr_{0.2})_{0.98}MnO_{3-\delta}$, remainder 10Sc1YSZ; and
the support layer is formed from 3YSZ.

10. The composite oxygen transport membrane of claim 9, wherein the porous support layer is formed of a freeze cast substance that has a ratio of the permeability of between 0.25 Darcy and about 0.5 Darcy and pores that are about 3 microns in diameter at a side of the porous support layer adjacent to the intermediate porous layer and about 10 microns in diameter at the opposite side of the porous support layer.

11. A method of applying a catalyst to a composite oxygen transport membrane, said method comprising:
forming a composite oxygen transport membrane in a sintered state, said composite oxygen transport membrane having a plurality of layers comprising a dense layer, a porous support layer and an intermediate porous layer located between the dense layer and the porous support layer, each of the dense layer and the intermediate porous layer capable of conducting oxygen ions and electrons at an elevated operational temperature to separate oxygen from an oxygen containing feed;
the dense layer and the intermediate porous layer comprising a mixture of an ionic conductive material and an electrically conductive materials to conduct oxygen ions and electrons, respectively, the ionic conductive material being a fluorite;
applying a solution containing catalyst precursors to the porous support layer on a side thereof opposite to the intermediate porous layer, the catalyst precursors selected to produce a catalyst, upon applying heat to the solution and the catalyst capable of promoting oxidation of the combustible substance in the presence of the oxygen;
infiltrating pores within the porous support layer with the solution so that the solution penetrates the pores and also, at least partially infiltrates the intermediate porous layer;
the infiltrating of the pores being conducted, at least in part, from the solution wicking through the pores, from one side of the porous support layer located opposite to the intermediate porous layer to the other side of the porous support layer located adjacent to the intermediate porous layer; and
heating the composite oxygen transport membrane after infiltrating the pores and the intermediate porous layer such that the catalyst is formed from the catalyst precursors.

12. The method of claim 11, wherein said porous support layer having a permeability of between 0.25 Darcy and about 0.5 Darcy and an average porosity of greater than about 20 percent.

13. The method of claim 11, wherein the support layer is formed by freeze casting.

14. The method of claim 11, wherein the pores of the support layer are of cylindrical or conical configuration.

15. The method of claim 12 or claim 13, wherein the solution is an aqueous metal ion solution containing 20 mol % $Gd(NO_3)_3$ and 80 mol % $Ce(NO_3)_3$ that when sintered forms $Gd_{0.8}Ce_{0.2}O_{2-\delta}$.

16. The method of claim 14, wherein a pressure is established on the second side of the support layer to assist in the infiltration of the solution or the pores can first be evacuated of air using a vacuum to further assist in wicking of the solution and prevent the opportunity of trapped air in the pores preventing wicking of the solution all the way through the support structure to the intermediate layer.

17. The method of claim 11, wherein the composite oxygen transport membrane is heated in service.

18. The method of claim 11, wherein the composite oxygen transport membrane is heated prior to being placed in service.

* * * * *